(12) United States Patent
Gregor

(10) Patent No.: US 9,328,528 B2
(45) Date of Patent: May 3, 2016

(54) TOWER FOR A WIND POWER STATION

(75) Inventor: Prass Gregor, Hamburg (DE)

(73) Assignee: Timber Tower GMBH, Hannover (DE)

( * ) Notice: Subject to any disclaimer, the term of this patent is extended or adjusted under 35 U.S.C. 154(b) by 0 days.

(21) Appl. No.: 13/395,077

(22) PCT Filed: Aug. 17, 2010

(86) PCT No.: PCT/EP2010/005032
§ 371 (c)(1),
(2), (4) Date: Mar. 8, 2012

(87) PCT Pub. No.: WO2011/029515
PCT Pub. Date: Mar. 17, 2011

(65) Prior Publication Data
US 2012/0174522 A1      Jul. 12, 2012

(30) Foreign Application Priority Data
Sep. 11, 2009   (DE) .......................... 10 2009 040 908

(51) Int. Cl.
| E04H 12/04 | (2006.01) |
| E04H 12/06 | (2006.01) |
| F03D 1/00 | (2006.01) |
| F03D 11/04 | (2006.01) |

(52) U.S. Cl.
CPC ................ *E04H 12/06* (2013.01); *F03D 1/001* (2013.01); *F03D 11/04* (2013.01); *F05B 2230/61* (2013.01); *F05B 2240/912* (2013.01); *Y02E 10/728* (2013.01)

(58) Field of Classification Search
CPC ....... E04H 12/06; E04H 12/342; E04H 11/04; E04C 3/30; F05B 2230/61

USPC ........... 52/40, 651.07, 651.01, 836, 834, 843, 52/848, 845; 248/127, 158; 416/DIG. 6
See application file for complete search history.

(56) References Cited

U.S. PATENT DOCUMENTS

| 1,652,403 | A | * | 12/1927 | Gerdeman | .................... 182/128 |
| 1,804,320 | A | * | 5/1931 | Cross | ............................... 52/249 |
| D84,905 | S | * | 8/1931 | Tate | .......................... D10/109.1 |
| 1,953,372 | A | * | 4/1934 | Stillger et al. | ................ 261/113 |
| 2,016,273 | A | * | 10/1935 | Atwood | ........................ 428/106 |
| 2,049,371 | A | * | 7/1936 | Haley | ............................... 52/376 |
| 2,567,958 | A | * | 9/1951 | Mummert | .................... 220/567 |
| 2,824,342 | A | * | 2/1958 | Hoyle, Jr. | ....................... 52/848 |
| 2,834,073 | A | * | 5/1958 | Hoyle, Jr. | ....................... 52/848 |
| 3,196,495 | A | * | 7/1965 | Owen | ............................. 49/400 |
| 3,485,005 | A | * | 12/1969 | Kutchai | .................... 52/651.01 |
| 4,387,546 | A | * | 6/1983 | Kurita et al. | .................... 52/847 |

(Continued)

FOREIGN PATENT DOCUMENTS

| GB | 2339436 A | * | 1/2000 | .............. E04H 12/02 |
| WO | WO 2011018758 A1 | * | 2/2011 | .............. E04H 12/04 |

*Primary Examiner* — Brent W Herring
(74) *Attorney, Agent, or Firm* — Mark Rodgers

(57) ABSTRACT

The invention relates to a tower for a wind power installation, with the walls of the tower being produced at least partially from individual wall sections, which are connected to one another via connecting means. The object of the invention is therefore to provide a tower for a wind power installation, which can be assembled with adequate precision. Furthermore, the object of the invention is to provide a method for erection of a tower such as this. With respect to the tower, the object according to the invention is achieved in that a falsework is provided at least partially in the tower interior, to which the wall sections are connected, holding them.

30 Claims, 12 Drawing Sheets

(56) References Cited

U.S. PATENT DOCUMENTS

| | | | |
|---|---|---|---|
| 4,470,235 A * | 9/1984 | Jenni | 52/282.2 |
| 4,602,470 A * | 7/1986 | Stuart et al. | 52/651.1 |
| 4,741,144 A * | 5/1988 | Graffin | 52/847 |
| 4,961,258 A * | 10/1990 | Menzel | 52/745.17 |
| 5,375,353 A * | 12/1994 | Hulse | 40/217 |
| 5,528,875 A * | 6/1996 | Ziegler et al. | 52/702 |
| 5,642,966 A * | 7/1997 | Morrison et al. | 405/195.1 |
| 6,453,624 B1 * | 9/2002 | Hoffman | 52/63 |
| 7,116,282 B2 * | 10/2006 | Trankina | 52/845 |
| 7,877,934 B2 * | 2/2011 | Livingston et al. | 52/40 |
| 8,074,414 B2 * | 12/2011 | Carrion et al. | 52/236.3 |
| 2002/0095905 A1 * | 7/2002 | Fawley | 52/736.3 |
| 2005/0166521 A1 * | 8/2005 | Silber | 52/633 |
| 2006/0213145 A1 * | 9/2006 | Haller | 52/651.01 |
| 2007/0294955 A1 * | 12/2007 | Sportel | 52/40 |
| 2008/0078128 A1 * | 4/2008 | Livingston et al. | 52/40 |
| 2013/0108465 A1 * | 5/2013 | Prass | 416/244 R |

* cited by examiner

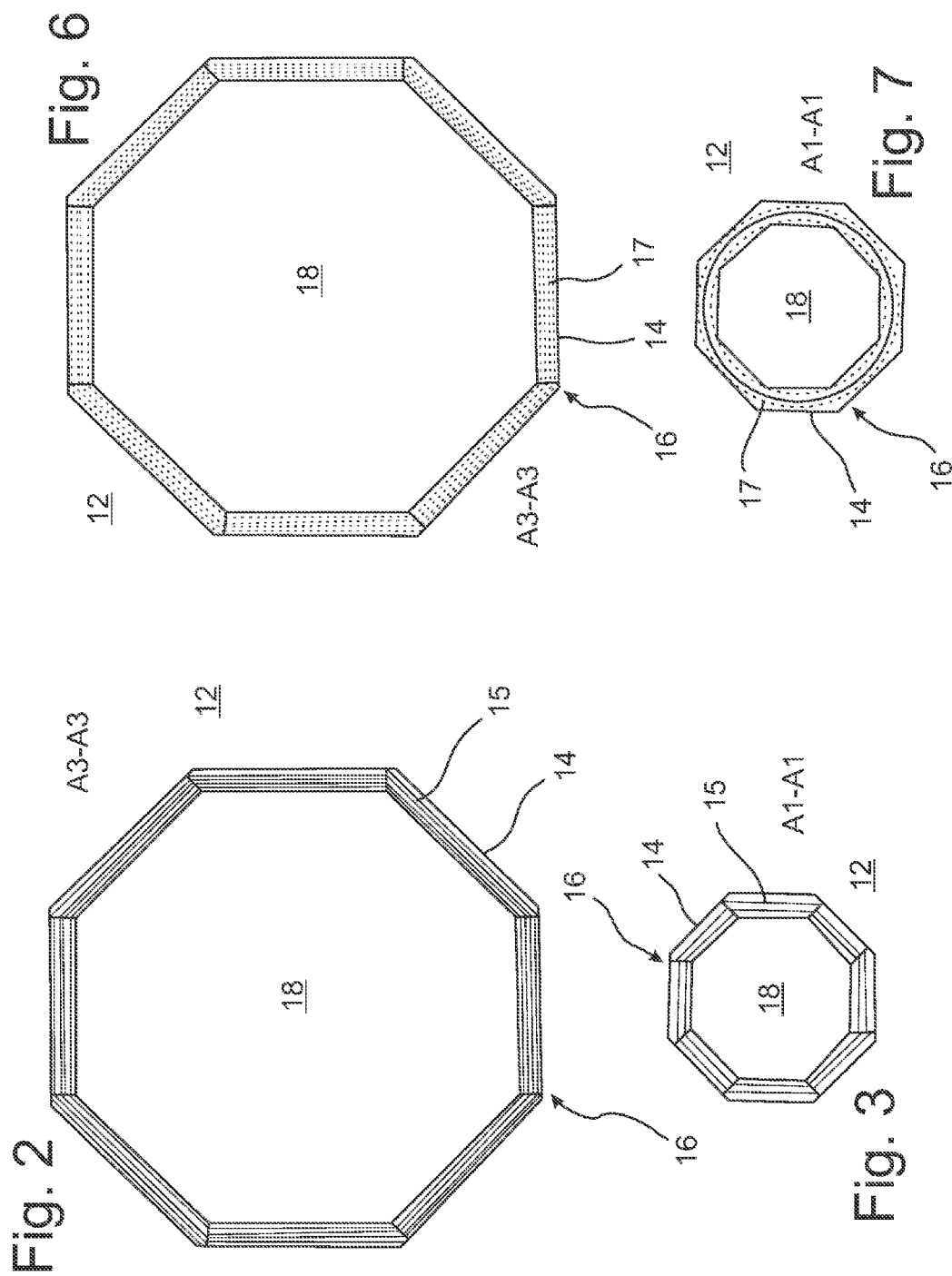

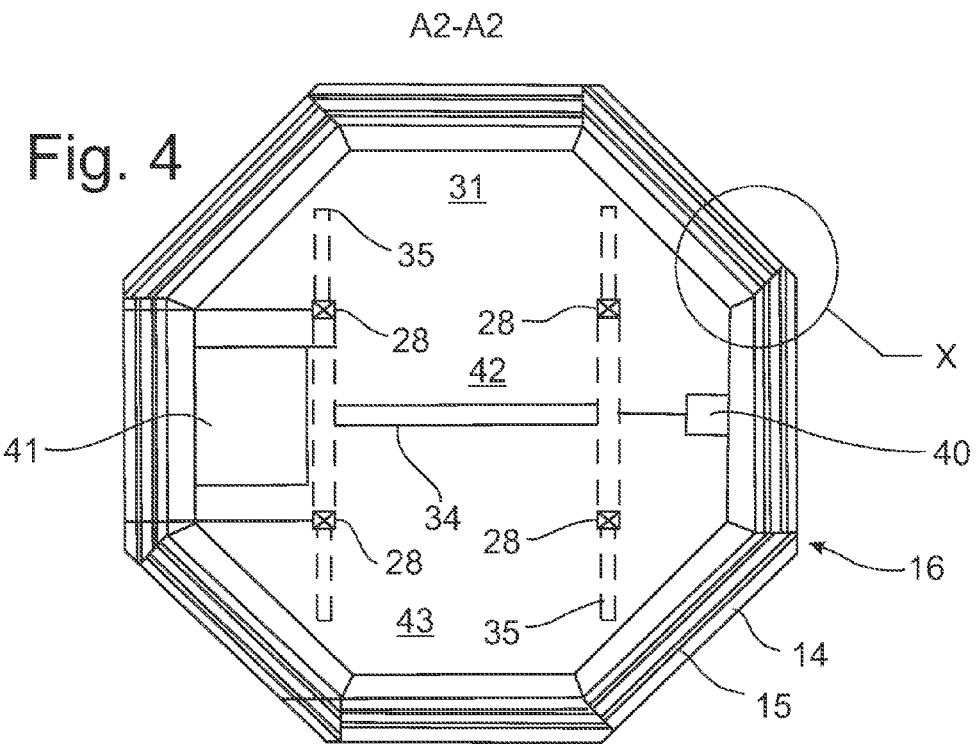
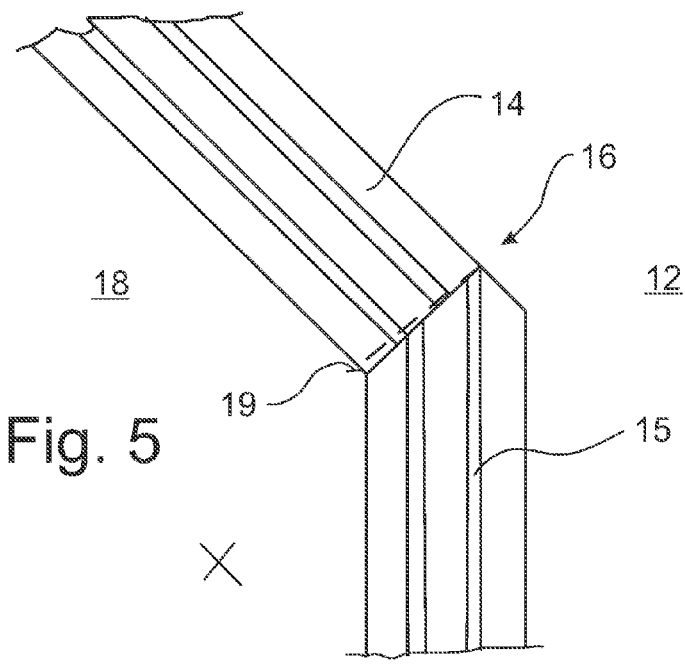

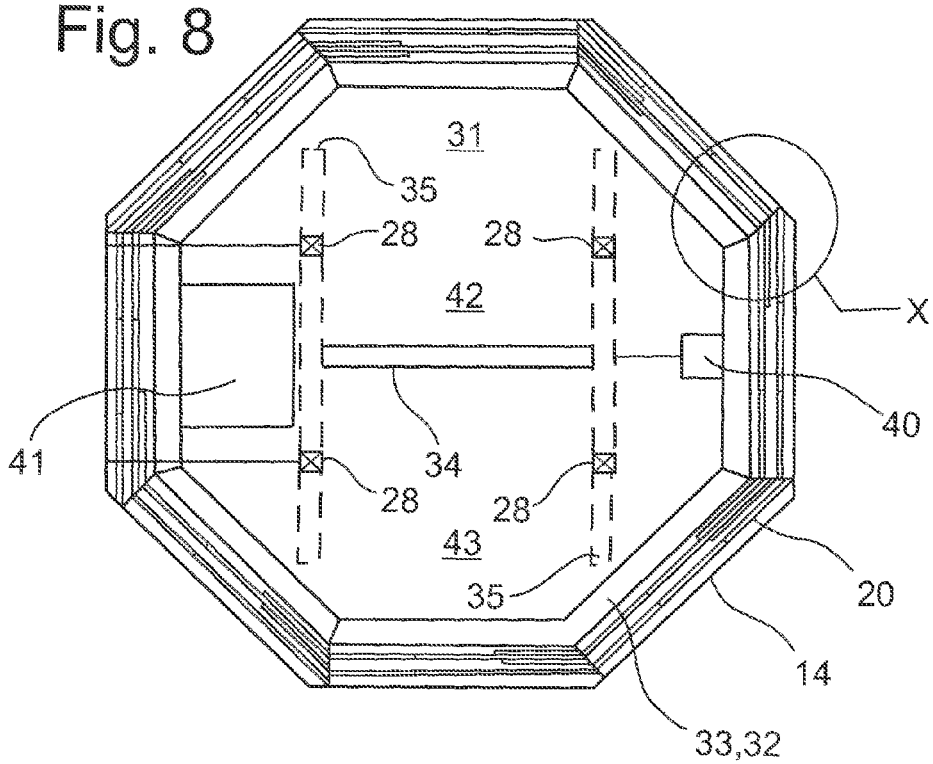
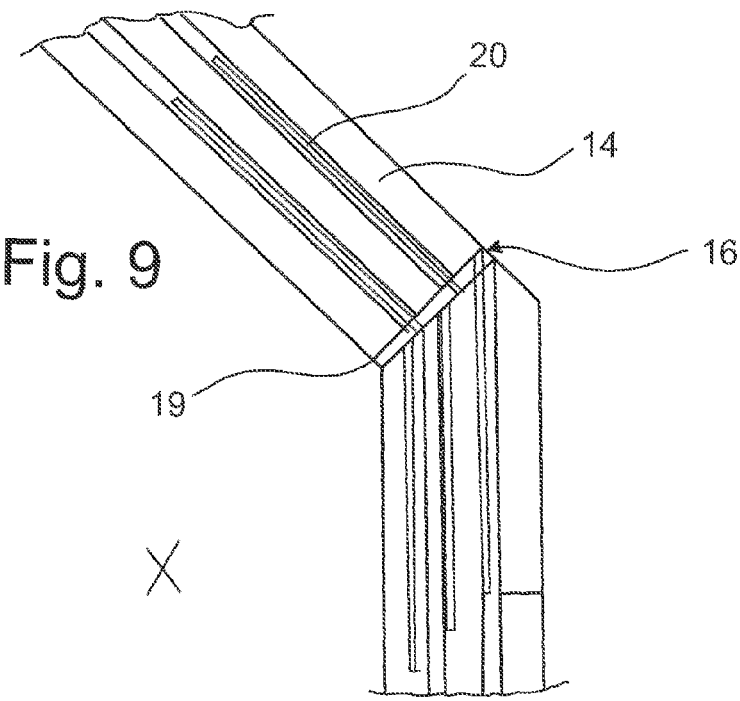

TOWER FOR A WIND POWER STATION

The invention relates to a tower for a wind power installation, wherein a falsework is provided at least partially in the tower interior, to which wall sections are connected, holding them, with the walls of the tower being produced at least partially from the individual wall sections, which are connected to one another via connecting means, and to a method for erection of a tower such as this.

A wind power installation is an apparatus for producing electrical energy. The wind power installation is provided with a foundation, a tower which is erected on the foundation and a nacelle which is arranged on the tower. The drive unit, which is connected to rotor blades, for energy production is located on the nacelle.

The design of the tower is based on the static load produced by the nacelle on the tower and the dynamic loads produced by the rotation of the rotating blades of the rotor and the capability of the nacelle to move, depending on the wind direction. Known towers are produced from steel rings or concrete elements. The base areas of the known towers are in this case either polygons or annular circle segments. Polygonal towers which are produced from individual segments composed of concrete are known from WO 2003/069099 A. It is also known for polygonal towers such as these to be erected from wood (DE 10 2007 006 652 A1).

For financial reasons, it is desirable to maximize the height of the towers in an economical manner, since the yield of a wind power installation depends on the hub height of the rotor, and the yield rises as the height increases. At the same time, the requirements for the static loads and material as well as the material consumption for the tower rise as a result of the greater height of the tower. The wall thicknesses increase, and therefore the erection outlay for the tower rises.

One critical aspect in this case of towers which are formed from segments arranged in sections is that the horizontal contact surfaces of the segments which are arranged one above the other are sensitive to thrust loads and lateral forces. This must taken into account in the statical design of the towers in order to reduce the load on this weak point, leading to increased use of material, and in particular necessitating the use of complex connecting means.

WO2003/083236A1 discloses a tower for a wind power installation, wherein a lattice mast is erected, around which lattice mast a cladding is fitted. The lattice mast bears the entire load acting on the tower. Here, there is a division between structurally functional elements (lattice mast) and a non-structural cladding, which causes the tower to take on the form of a solid-body tower. The cladding is either screwed directly to the tower or is connected to the latter by means of clamping forces. In this context, it is described that a lattice structure has cost advantages over a solid-surface tower, and also that a lattice tower is more advantageous than a solid-surface tower with regard to loading.

It has been found that towers for wind power installations can be produced from wood, allowing the towers to be produced cost-effectively, quickly and with material being saved. In this case, it has been particularly advantageous to manufacture these towers on site from individual components which are each directly connected to the adjacent elements via connecting means. However, in this case, it has been found that the erection process needs improvement to allow the individual components to be connected to one another quickly and with high precision without major fitting tolerances occurring.

The object of the invention is therefore to provide a tower for a wind power installation which can be assembled with sufficient precision. Furthermore, the object of the invention is to provide a method for the erection of a tower such as this.

With regard to the tower, the object according to the invention is achieved in that the wall sections are composed of a wooden material, and in that the wall sections are designed such that the wall sections absorb the entire static load and dissipate it, and the falsework is an assembly aid. This allows the individual wall sections to be fitted to one another and assembled safely. The assembly accuracy is therefore increased in a simple manner. At the same time, the total static load is still absorbed by the wall elements.

A further teaching of the invention provides that the falsework is composed of wood and/or is a framework structure. In this case, the erection process is carried out successively with progressive building progress. The wood to be used can in this case be processed cost-effectively and very well. The falsework is preferably formed from individual sections. In this case, it is advantageous for the individual sections to be manufactured on site since this reduces the transport effort. This is preferably ensured by the use of wood. It is furthermore advantageous for the framework structure to have at least four stands, which are connected by struts, bars, head blocks and sole blocks. A further teaching of the invention provides for the platform to be formed from at least two sections.

A further teaching of the invention provides for the wall sections to be arranged offset with respect to one another, forming a helix. This mutual arrangement results in the thrust load/lateral force being dissipated via the helix, and there is no point of contact for the tower to be lifted off at a predetermined point. For this reason, wall thicknesses can be reduced and, in particular, it is possible to choose simpler and therefore more cost-effective connecting means.

A further teaching of the invention provides that the helix is a single helix or a multiple helix formed from a plurality of single helices. In the case of a multiple helix, it is advantageous for the number of single helices which form the multiple helix to correspond to the number of wall sections on a horizontal level of the tower. In the case of the multiple helix, the wall sections are preferably provided as diamonds placed on end. The diamond is in this case provided as a circle segment or is formed by two triangles which are connected to one another vertically, with the surfaces of the triangles being arranged at an angle to one another which is 360° divided by the number of single helices. It is furthermore advantageous for the upper abutment faces of the individual components to have a helix, a continuous line and/or a step. This improves the load dissipation in the tower.

A further teaching of the invention provides for the wall sections to have slots at least in places in the abutments, which are arranged transversely with respect to the abutment direction and/or along the abutment direction. Connecting means are preferably inserted into the slots, which connecting means are preferably metal sheets, particularly preferably perforated metal sheets, which are preferably adhesively bonded. In addition, the abutment openings can be masked for example by means of a tape or plexiglass. The adhesive is preferably introduced by spraying in the areas between the component and the connecting element. Alternatively, wooden parts or wooden dowels can be used, if the components are wooden elements. These connecting means are cost-effective elements which, however, provide the required strengths in terms of thrust and thrust loads between the individual components.

In addition to the operating loads which act on the tower, climatic loads also act on the tower. In the case of steel towers, this climatic load is counteracted by application of paint to the tower. When using steel-reinforced concrete, the steel framework absorbs the tensile loads of the tower. The concrete covering absorbs the compression loads and is at the same time used for protection of the steel structure against the environmental influences, in the form of moisture and chemical reactions caused by the surrounding atmosphere. The thickness of the concrete has to ensure that the steel framework is protected against these loads. In the case of wooden structures, corresponding weather loads are counteracted by painting. At the same time, only wooden materials which are authorized for outdoor use can be used for construction of wooden towers.

A further teaching of the invention therefore provides for a coating to be applied at least in places to the outer surface of the tower, with the coating preferably being applied such that the coating absorbs tensile loads which act on the outer surface of the tower, and such that the coating seals the outer surface against environmental influences, in particular moisture, acting on the surface of the tower from the outside.

For wooden towers, the coating makes it possible to use wooden materials and their connecting means which are authorized only for indoor construction.

A further teaching of the invention provides that the coating is applied in the coated section of the tower over the entire area thereof, and sheaths the coated section. In this case, it is advantageous for the coating to be a layer material, a film, a fabric, a textile or a panel. It is particularly preferably a film, a panel, a fabric and/or a textile composed of plastic, with polypropylene, polyurethane, polyvinyl chloride, polyester, polycarbonate or polyethylene particularly preferably being used as materials. Materials such as these are able to absorb tensile stresses while at the same time providing a termination and therefore sealing against the environmental influences acting on the surface of the tower. At the same time, materials such as these have lower weights per unit area than, for example, paints on the surface of the tower, thus allowing this weight in the structure to be reduced in terms of the static compression load, thus making it possible to also design the tower structure to be slimmer overall. At the same time, the costs of these materials are less, for example, than paints.

A further teaching of the invention provides for the coating to be applied at different times during tower erection. As a first variant, the coating is applied after erection of the tower. This can be done from the top or from the bottom. Alternatively, the coating can be applied in sections during the erection of the tower, or can be applied to the individual components even before the tower is erected. If the coating is applied before erection of the tower, it has been found to be advantageous for the coating to be applied in situ, on the building site. This reduces the coating costs, while at the same time making it possible to ensure that the coating is not damaged while the individual elements are being transported. The individual sections of the coating are then connected to one another, with the connection particularly preferably being made by adhesive bonding or welding of the abutments.

A further teaching of the invention provides for the coating to be applied directly to the components of the tower. It is preferably applied over the entire area by adhesive bonding. Alternatively, it is possible to make use of adhesive bonding in sections, on a surface of a component. The adhesive bonding ensures that the static load is absorbed by the coating.

A further teaching of the invention provides for the tower to be erected at least partially from steel, concrete, in particular steel-reinforced concrete, and/or wood or wooden material. The wood or wooden material is preferably cross-laminated timber and/or wooden composite materials.

A further teaching of the invention provides for the coating in the case of wood to be less permeable to water vapor than the wood. This reverses the diffusion, that is to say the permeability of the tower to water vapor becomes greater towards the inside rather than towards the outside. Furthermore, a heat generator is preferably arranged in the interior of the tower, with this preferably being the power electronics of a wind power installation. The heat is in this case the power loss emitted from the power electronics. The heat that is generated dissipates the moisture located in the interior of the tower upwards, and the moisture which emerges from the wood is moved towards the interior of the tower, and is likewise also dissipated. If the coating is damaged, this ensures that the moisture is transported away inwards. The particles and minerals contained in the moisture gradually seal up the damage to the coating, while at the same time also ensuring that the moisture escapes inwards.

A further teaching of the invention provides for the load-bearing structure of the tower to be erected at least partially from materials which are not suitable for outdoor use. These are materials which have been authorized only for indoor use in the construction of buildings. The application of the coating makes it possible to use materials such as these as well as connecting means for the load-bearing structure of a tower for a wind power installation, because the coating ensures that the materials are in the state for indoor use.

A further teaching of the invention provides for the tower to be assembled from individual components on site. The components which are assembled on site are flat elements. Such assembly of the tower from individual flat elements ensures that the transport effort for the individual towers is considerably reduced.

With regard to the method, the object according to the invention is achieved by providing the following steps: fitting of a first section of a falsework on a foundation; provision of the first wall sections; fitting of the first wall sections on the foundation; attachment of the first wall sections to the first section of the falsework; fitting of the next section of the falsework to the upper face of the previous falsework section; fitting of the next wall sections to the sections located beneath them, and production of a permanent connection to the already fitted wall sections and to the falsework; repetition of the steps until the uppermost section of the falsework has been fitted, and the final walls sections have been attached. Furthermore, the method results in erection of a tower having the features mentioned above.

The invention will be explained in more detail in the following text with reference to preferred exemplary embodiments and in conjunction with a drawing, in which:

FIG. 2 shows the view A3-A3 from FIG. 1 in a first embodiment,

FIG. 3 shows the view A1-A1 from FIG. 1 in a first embodiment,

FIG. 4 shows the view A2-A2 from FIG. 1 in a first embodiment,

FIG. 5 shows the view X in FIG. 4 in a first embodiment,

FIG. 6 shows the view A3-A3 in FIG. 1 in a second embodiment,

FIG. 7 shows the view A1-A1 in FIG. 1 in a second embodiment,

FIG. 8 shows the view A2-A2 in FIG. 1 in a second embodiment,

FIG. 9 shows the view X in FIG. 8 in a second embodiment,

Figure 10:
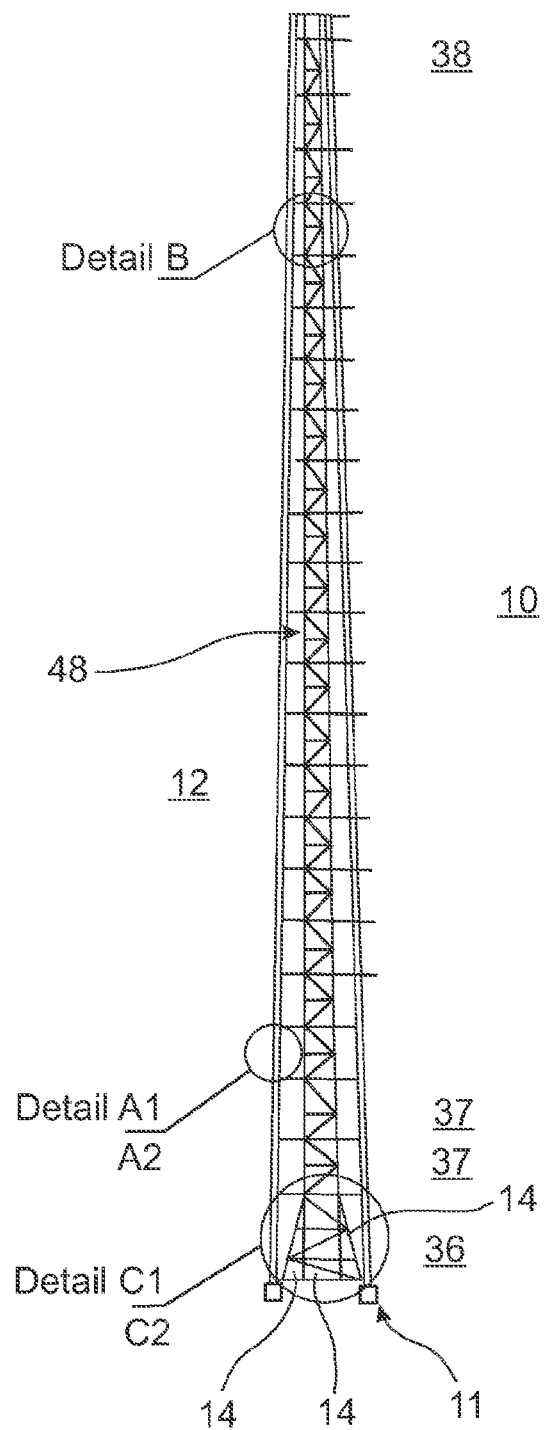
Figure 11:
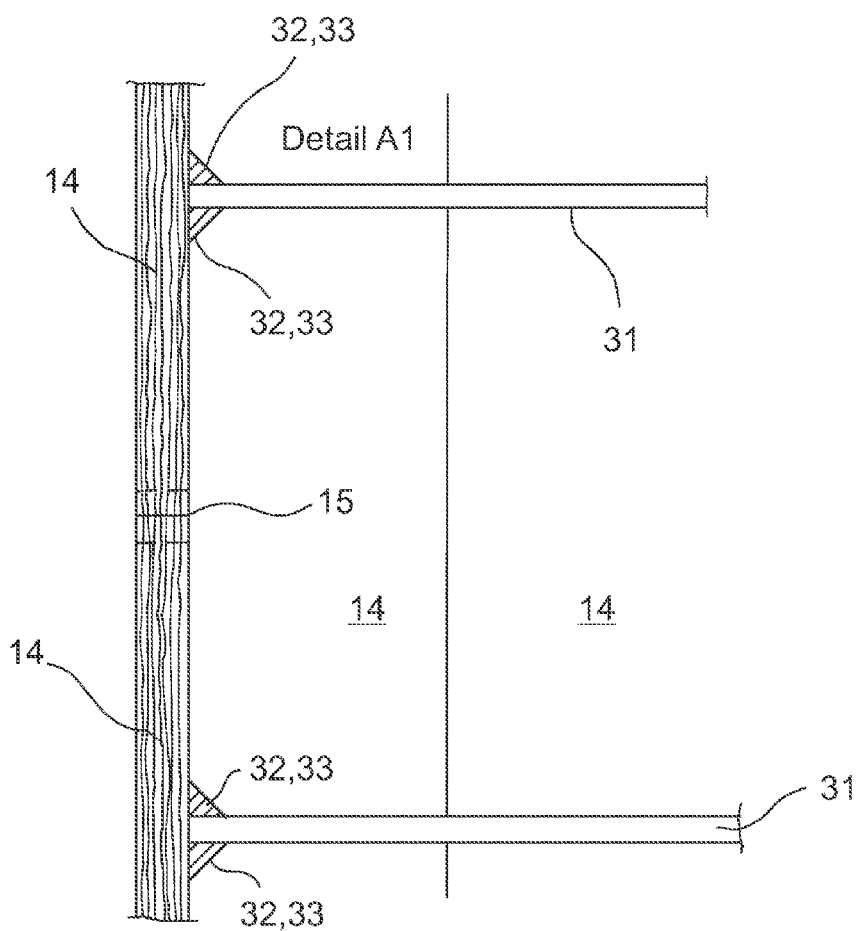
Figure 12:
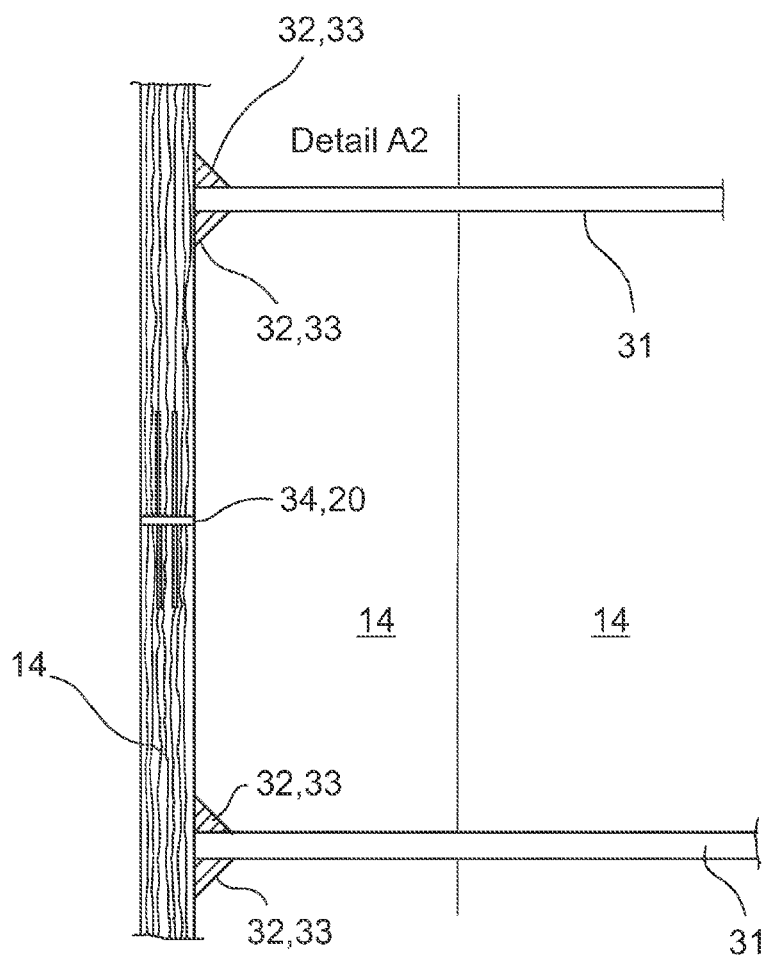
Figure 13:
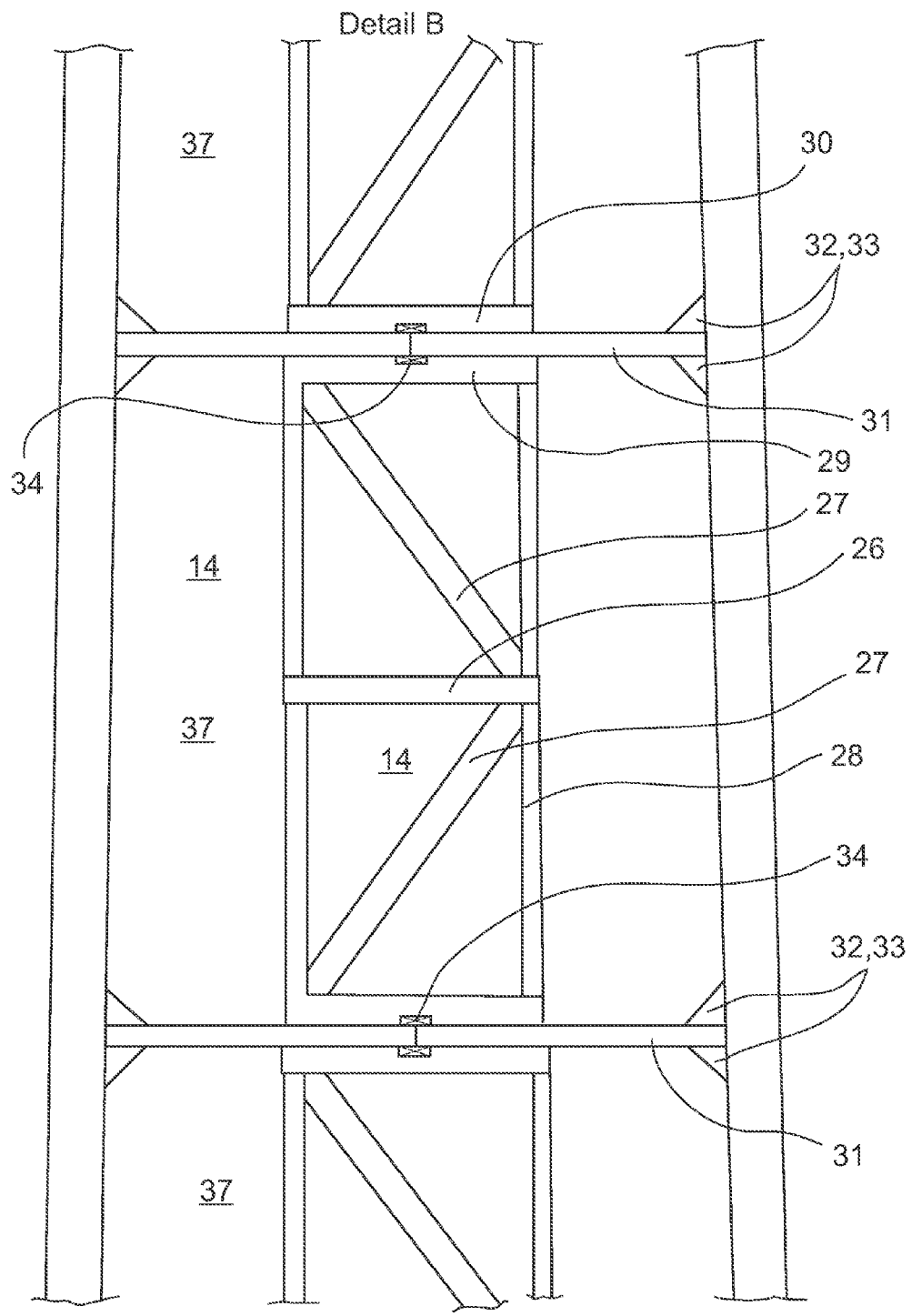
Figure 14:
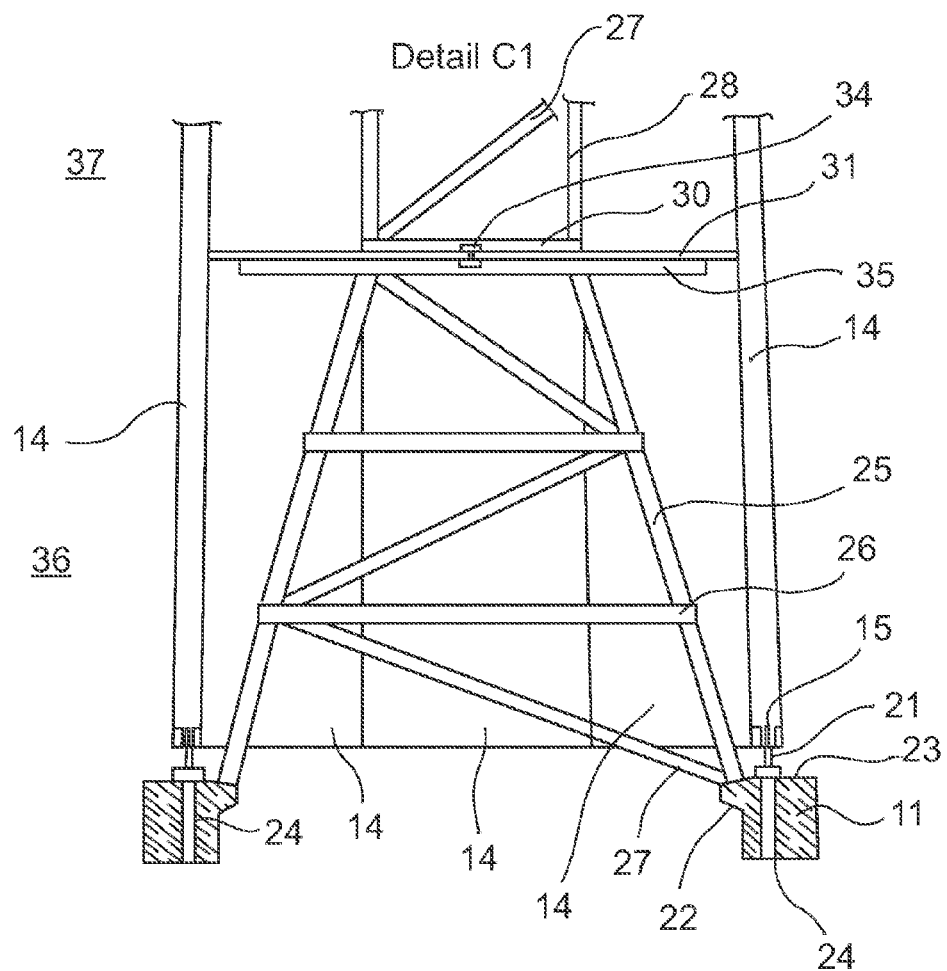
Figure 15:
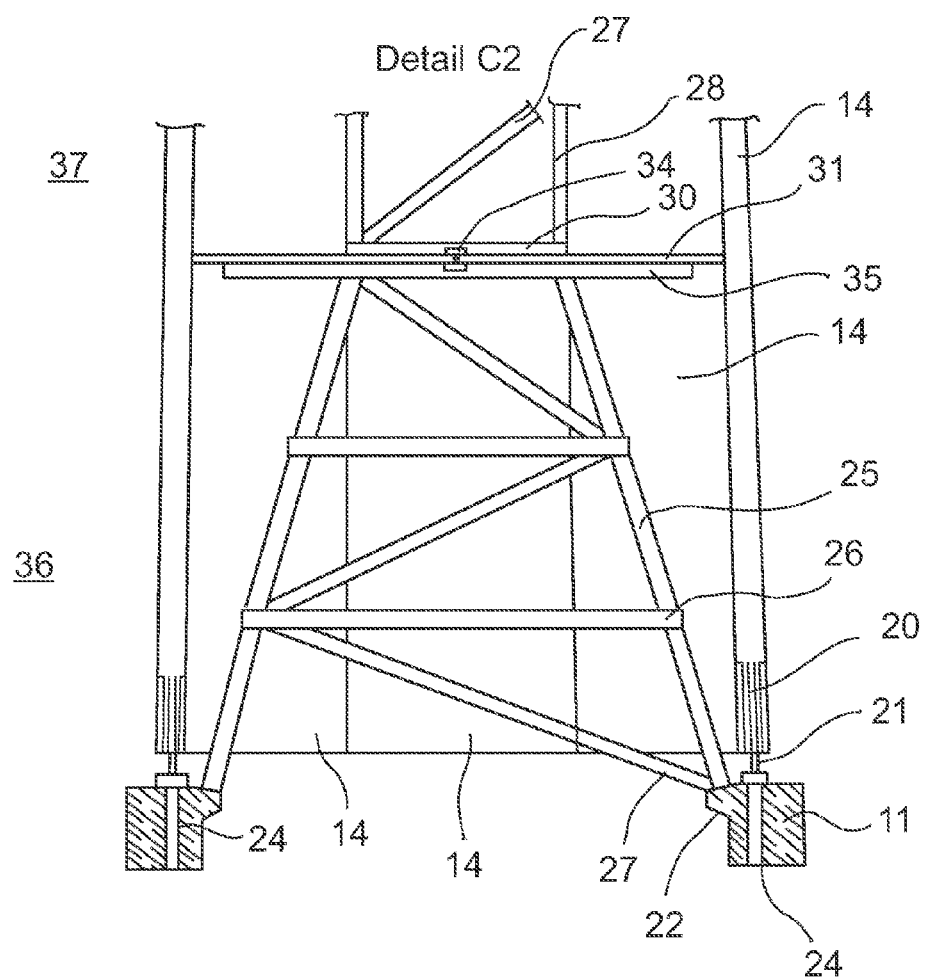
Figure 16:
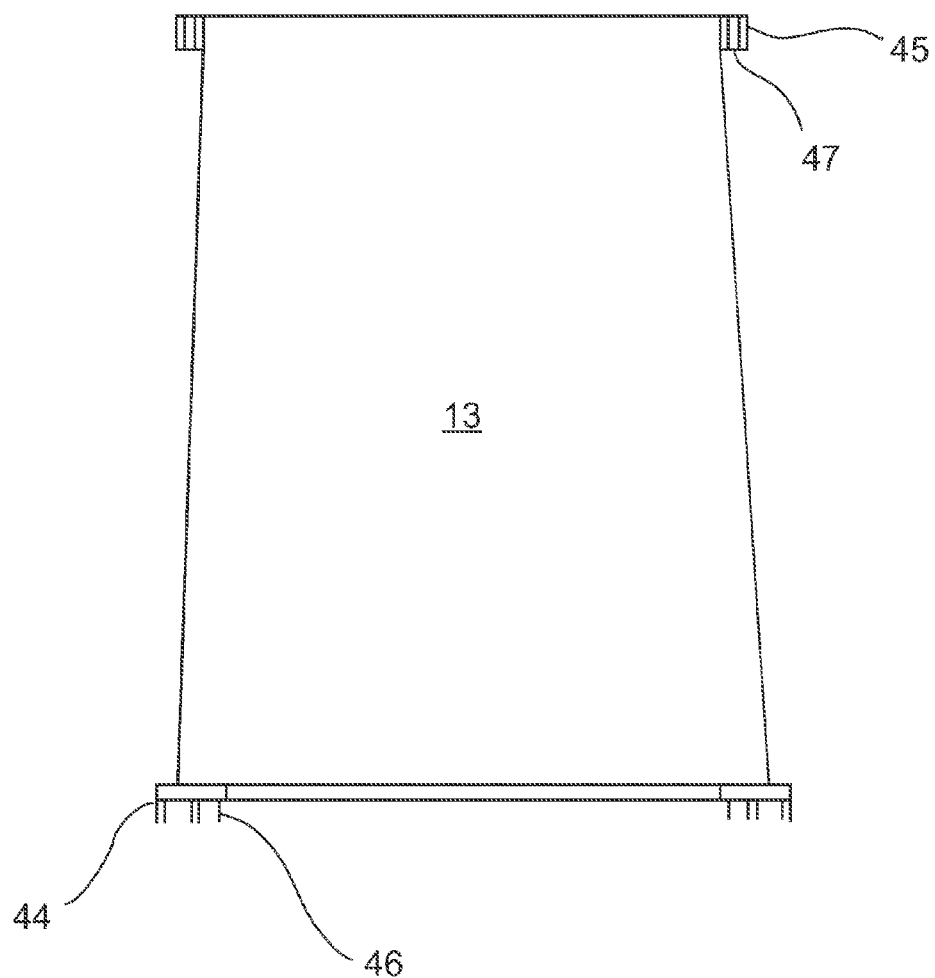
Figure 19:
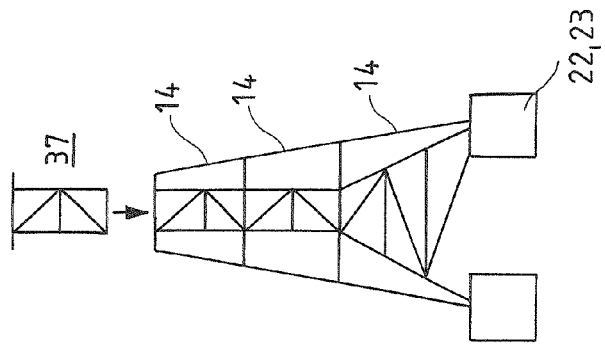
Figure 18:
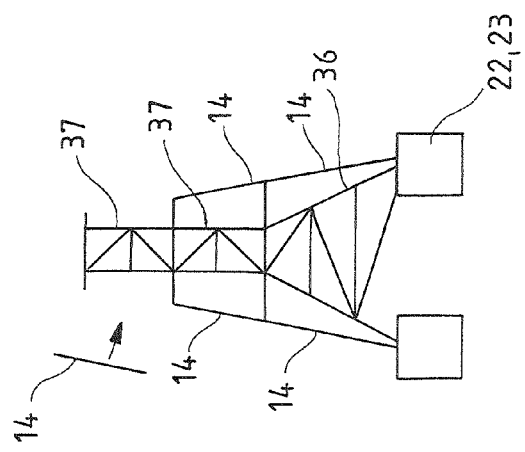
Figure 17:
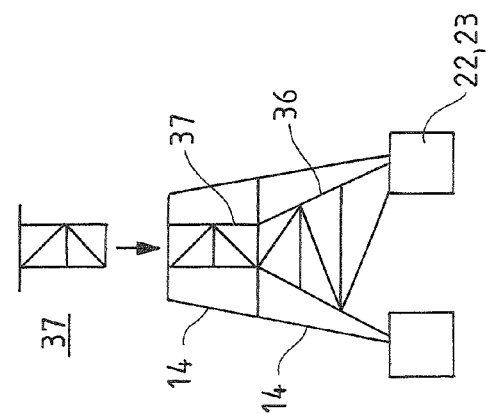

FIG. 10 shows a three-dimensional section illustration of a tower according to the invention, FIG. 11 shows a detail view A1 from FIG. 10, FIG. 12 shows a detail view A2 from FIG. 10, FIG. 13 shows a detail view B from FIG. 10, FIG. 14 shows a detail view C1 from FIG. 10, FIG. 15 shows a detail view C2 from FIG. 10, FIG. 16 shows a three-dimensional section illustration of a nacelle adaptor of a tower according to the invention, FIG. 17 shows a schematic illustration of a first assembly step in a method according to the invention, FIG. 18 shows a schematic illustration of a second assembly step in a method according to the invention, and FIG. 19 shows a schematic illustration of a third assembly step in a method according to the invention.

Figure 1:
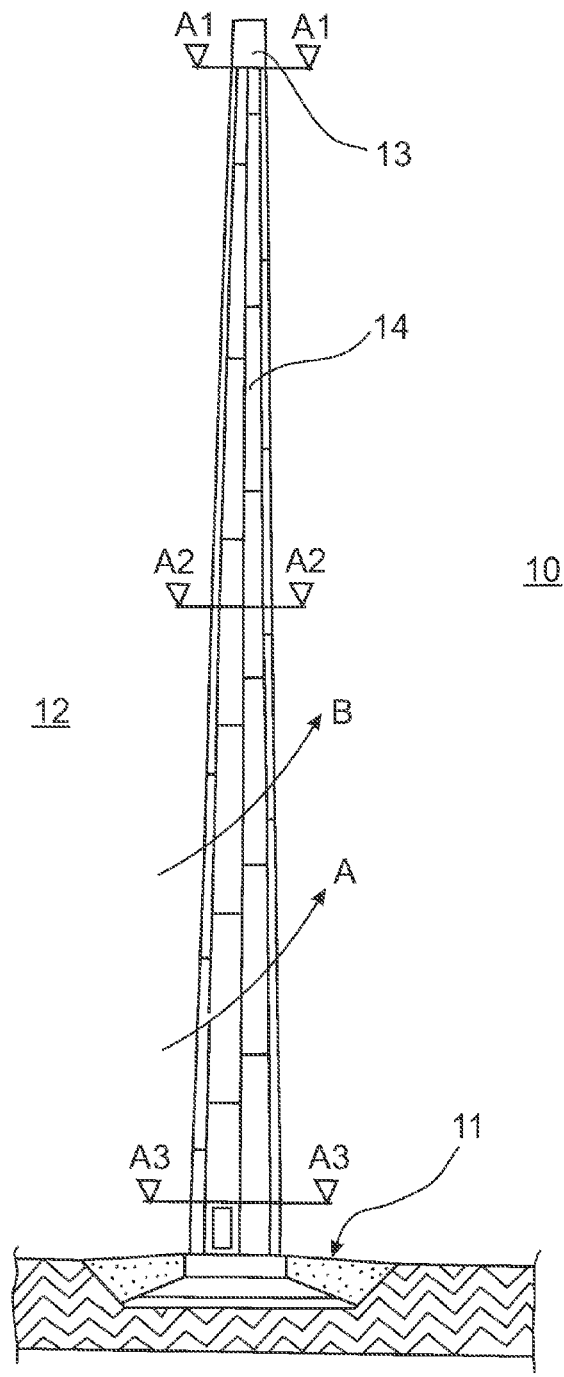
FIG. 1 shows a three-dimensional view of the tower according to the invention.

FIG. 1 shows a tower 10 composed of wood with a hub height of, for example, 100 meters. The tower has a base in the form of a foundation 11, a tower body 12 and a connecting piece 13 for holding a nacelle of a wind power installation (not illustrated).

The base 11 of the wooden tower 10 is formed by a foundation 11, preferably a steel-reinforced concrete foundation with a steel-reinforced concrete base, particularly preferably in the form of in-situ concrete. The geometry of the steel-reinforced concrete base is matched to the geometry of the wooden tower structure, with the base in this case preferably being designed to be concreted to form an octagonal hollow body. The converter and transformer system required for outputting power to the grid system is, for example, preferably accommodated in the hollow body as a foundation base. The installation is accessed through the foundation base, allowing the wooden tower 10 to be constructed homogeneously.

The main part of the tower 10 is formed by a tower section 12 which is assembled from individual wall sections 14 in the form of wooden panels, which form an octagonal hollow body. The individual panels 14 are in this case arranged in the helix structure A. A double-helix structure is illustrated in the present case, with the two helices A and B. Each individual wooden panel 14 consists of solid wooden elements adhesively bonded to one another.

Dovetails 39 or perforated metal sheets 15 may be used as connecting means for the horizontal and vertical connections. Furthermore, it is also possible to use threaded rods 20 inserted into and preferably adhesively bonded in gaps. The individual wooden panels 14 are suspended in the already fitted wooden panels 14 by means of steel dovetails 39. The dovetails 39 are attached to the wooden panels 14 by adhesively bonded-in threaded rods 20.

A falsework 48 is erected as an assembly aid in order to erect the hollow body 12 has a tower body by the assembly of the wooden panels 14 in the helix structure A or double-helix structure A-B. The falsework consists of sections 36, 37, 38, and is preferably in the form of a framework structure. A platform 31 is arranged at the upper end of the framework, and acts as a stiffening level 31 in the wooden tower 12. By way of example, there is a double-T support between the foundation base 11 and the wooden tower 12. The support 21 is connected to the foundation 11 via threaded rods 24. The connection between the wooden tower and the double-T support, as a foot-point configuration, is produced by the prestressing of adhesively bonded-in threaded rods (FIG. 15) or by perforated metal sheets (FIG. 14). The connecting piece 13 between the wooden tower 12 and the nacelle of the wind energy installation is formed by a steel tube adaptor 13, in the form of a truncated cone (see FIG. 16). The tower is provided with a completely adhesively bonded, textile surface (not illustrated) which is fitted immediately after the panels 14 have been fitted and surrounds the complete area of the tower 10, with an overlap, after completion of the alignment tasks.

The entrance to the tower is located in the foundation base, and the tower is entered by an outside staircase with a platform. The low-voltage components are installed within the foundation base. These include the control cabinet for control of the installation, power cabinets and, optionally, remote monitoring and an independent power supply (UPS). In order to dissipate the heat from the transformer, an axial fan is fitted underneath the platform. A ladder-guided elevator system 41 or a ladder in conjunction with climbing protection device is used for getting up to the tower head. Rest platforms are fitted at intervals of at most 10 m, for ladder lengths of more than 10 m. Intermediate platforms 31 are located every 3.75 m in the wooden tower, and are fitted statically in order to stiffen the tower structure.

The falsework 48 is used as an assembly aid and to ensure that the individual wooden panels 14 are fitted correctly in place. The individual stiffening levels 31 consist of wooden panels 42, 43. Each individual stiffening level 31 of the falsework 48 is supported four times by the provision of stands 25, 28, in order to ensure the position of the stiffening level 31 and to carry away the natural weight and the assembly loads into the foundation 31. The stands 25, 28 are in this case connected to one another as a framework by means of bars 26 and struts 27 as well as head blocks and sole blocks 29, 30 (FIG. 13). The individual parts 42, 43 of the stiffening level 31 are connected to one another, stabilized by means of a plank 34, on their mutually touching end surfaces. The falsework itself consists of a first falsework section, which has base stands 25 which rest on a framework foundation 22, which is a component of the foundation 11 and is connected to the tower foundation. The base stands 25 are arranged diagonally such that, at their upper end, at which the head block 29 or a beam 35 is provided (see FIGS. 4, 8, 14, 15), the next falsework section 37 can be provided with the actually required width of the falsework 48. By way of example, a cable shaft 40 and a shaft 41 for an elevator or a ladder system are provided on the stiffening level 31. The edges of the stiffening level 31 are sealed by squared timbers 32 or molded beams 33 (FIGS. 11, 12). These elements also result in a stiffening connection being produced between stiffening level 31 and wall elements 14 of the tower. The falsework 48 ends with an upper falsework section 38 which is smaller than the last tower wall sections 14, as a result of which there is no connection between the adaptor 13 and the falsework 48.

In order to erect the tower 10, the wooden panels 14, which have already been attached on a trial basis, are moved to the installation site. The falsework 48 is then started by positioning the lowermost, first section 36 of the falsework 48 on the foundation 11, 22. The lowermost eight wooden panels 14 are connected in an interlocking and force-fitting manner to the first falsework section 36 and to one another, by means of screw connections. Either perforated metal sheets 15 or dovetails 39 are used for this purpose. The structure is then raised onto the already completed foundation base 22. The foot-point connection between the wooden tower 12 and the foundation 22 is made by means of bonded-in threaded rods 24 into the panels, which are connected to the individual double-T profiles by means of nuts, and are already preassembled. After the lower tower segment has been lowered, it is screwed to the foundation base. The connections of the vertical abutments 19 of the wooden panels 14 are made at the same time as the progress in the wooden tower direction. The vertical abutments 19 are connected by adhesively bonding in solid wooden wedges 19. If dovetails 39 are used for the connection, a high fit accuracy of the panel arrangement is achieved in the horizontal abutment during assembly by the geometric arrangement when the panels 14 were assembled on a trial basis. The arriving wooden panel 14 is fitted to the respective upper wooden panel end, and is screwed tight by means of a screwdriving apparatus. In this case as well, the built state is achieved during the alignment process by a screw connection to the falsework. Alternatively, perforated metal sheets 15 are provided instead of dovetails 39. The embodiment of the vertical abutments with adhesively bonded-in solid wooden wedges 19 (FIGS. 5, 9). The interlocking and force-fitting connection in the area of the connection of the horizontal abutments of the wooden panels is made via adhesively bonded-in threaded rods which are screwed to the metallic dovetail and are prestressed. Tensile forces can be transmitted between wood and wood and between steel and wood by means of perforated metal sheet connectors. The perforated metal sheet connectors are perforated steel sheets. The form of the perforated metal sheet is illustrated in FIG. 2 to FIG. 5, and the form of the dovetail is illustrated in FIGS. 6 to 9.

The adapter 13 consists of a possibly conical steel element with a foot flange 44 for connection to the tower 12, and with a head flange 45 for connection to the nacelle. Holes 47 are provided on the head flange 35 for passing threaded rods of the nacelle through in order to make a permanent connection. Either holes or threaded rods 46 are likewise provided on the foot flange 44.

In order to assemble the tower 12 (FIGS. 17 to 19), a lower falsework section 36 is placed on the foundation 11, to which falsework section 36 the first wall sections 14 are attached, with these being arranged such that they are positioned vertically on the foundation 11. The next wall section 37 is then placed on the stiffening level 31, and is connected to the section 36 located underneath. The wall sections 14 are once again fitted circumferentially, with a permanent connection being produced to the previously fitted wall sections. A connection to the falsework section is used to improve the assembly capability. After the wall sections 14 have been finally fitted, the next falsework section is fitted. In this case, the falsework sections 36, 37, 38 may be initially assembled on site. In the case of a helix assembly, the falsework sections are shorter in height than the individual wall sections 14, as a result of which the falsework sections can even be fitted alternately with the respectively next single wall section.

| List of reference symbols | |
|---|---|
| 10 | Tower |
| 11 | Foundation |
| 12 | Tower section |
| 13 | Nacelle adaptor |
| 14 | Wall section |
| 15 | Perforated metal sheet |
| 16 | Connecting section |
| 17 | Hole |
| 18 | Tower interior |
| 19 | Wedge block |
| 20 | Threaded rod |
| 21 | Double-T support |
| 22 | Framework foundation |
| 23 | Tower foundation |
| 24 | Threaded rod |
| 25 | Base stands |
| 26 | Bar |
| 27 | Struts |
| 28 | Stands |
| 29 | Head block |
| 30 | Sole block |
| 31 | Stiffening level |
| 32 | Squared timbers |
| 33 | Molded beams |
| 34 | Plank |
| 35 | Beam |
| 36 | 1st falsework section |
| 37 | falsework section |
| 38 | Uppermost falsework section |
| 39 | Dovetail |
| 40 | Cable shaft |
| 41 | Elevator shaft |
| 42 | 1st part of the stiffening level |
| 43 | 2nd part of the stiffening level |
| 44 | Foot flange |
| 45 | Head flange |
| 46 | Threaded rod |
| 47 | Hole |
| A | First helix |
| B | Second helix |

The invention claimed is:

1. A tower for a wind power installation, comprising;
   an exterior wall comprising exterior wall sections connected to one another when fully assembled, and;
   a falsework assembly aid comprising;
   a mast element disposed at least partially in the tower interior,
   a plurality of assembly connection elements disposed along the length of the mast configured to hold unassembled wall sections for assembly, wherein;
   the falsework and the exterior wall sections are composed of a wooden material,
   the exterior wall sections when fully assembled are configured to bear the entire load of the tower,
   the falsework is configured to hold and bear the load of unconnected wall sections during assembly, and;
   the falsework can be removed when the wall sections are fully assembled without affecting the load bearing of the tower.

2. The tower as claimed in claim 1, characterized in that the falsework is composed of a plurality of sections, with one section, at its upper end, having a platform, to which the wall sections are connected, with the platform being a stiffening level of the falsework.

3. The tower as claimed in claim 1, characterized in that the falsework framework structure has at least four stands, which are connected by struts, bars, head blocks and sole blocks.

4. The tower as claimed in claim 1, characterized in that the wall sections are arranged offset with respect to one another, forming a helix, with the helix being a single helix or a multiple helix formed from a plurality of single helices.

5. The tower as claimed in claim 4, characterized in that the number of single helices which form the multiple helix corresponds to the number of wall sections on a horizontal level of the tower.

6. The tower as claimed in claim 1, characterized in that the upper abutment faces of the individual wall sections have a helix, a continuous line or a step.

7. The tower as claimed in claim 1, characterized in that the wooden material is cross-laminated timber or wooden composite material.

8. The tower as claimed in claim 1, characterized in that the tower can be assembled from the individual wall sections on site.

9. The tower as claimed in claim 1, characterized in that the surface of the outside of the tower is provided with a coating, with the coating absorbing at least some of the tensile load acting on the surface of the tower, and sealing the surface of the outside of the tower against the environmental influences, including moisture, acting on the surface from the outside.

10. The tower as claimed in claim 9, characterized in that the coating is applied at least in parts over the entire area to the surface of the outside of the tower, or in that the coating is a layer material, a film, a fabric, a panel or a textile.

11. The tower as claimed in claim 1, characterized in that the falsework framework structure has at least four stands, which are connected by struts, bars, head blocks and sole blocks.

12. A tower for a wind power installation, comprising;
an exterior wall comprising exterior wall sections connected to one another when fully assembled, and;
a falsework assembly aid comprising;
a mast element disposed at least partially in the tower interior,
a plurality of assembly connection elements disposed along the length of the mast configured to hold unassembled wall sections for assembly, wherein;
the falsework and the exterior wall sections are composed of a wooden material,
the exterior wall sections when fully assembled are configured to bear the entire load of the tower,
the falsework is configured to hold and bear the load of unconnected wall sections during assembly, and;
the falsework structures to which the external wall sections are attached are at least one of lattice or truss structures.

13. The tower as claimed in claim 12, characterized in that the falsework is composed of a plurality of sections, with one section, at its upper end, having a platform, to which the wall sections are connected, with the platform being a stiffening level of the falsework.

14. The tower as claimed in claim 12, characterized in that the wall sections are arranged offset with respect to one another, forming a helix, with the helix being a single helix or a multiple helix formed from a plurality of single helices.

15. The tower as claimed in claim 14, characterized in that the number of single helices which form the multiple helix corresponds to the number of wall sections on a horizontal level of the tower.

16. The tower as claimed in claim 12, characterized in that the upper abutment faces of the individual wall sections have a helix, a continuous line or a step.

17. The tower as claimed in claim 12, characterized in that the wooden material is cross-laminated timber or wooden composite material.

18. The tower as claimed in claim 12, characterized in that the tower can be assembled from the individual wall sections on site.

19. The tower as claimed in claim 12, characterized in that the surface of the outside of the tower is provided with a coating, with the coating absorbing at least some of the tensile load acting on the surface of the tower, and sealing the surface of the outside of the tower against the environmental influences, including moisture, acting on the surface from the outside.

20. The tower as claimed in claim 19, characterized in that the coating is applied at least in parts over the entire area to the surface of the outside of the tower, or in that the coating is a layer material, a film, a fabric, a panel or a textile.

21. A tower for a wind power installation, comprising;
an exterior wall comprising exterior wall sections connected to one another when fully assembled, and;
a falsework assembly aid comprising;
a mast element disposed at least partially in the tower interior,
a plurality of assembly connection elements disposed along the length of the mast configured to hold unassembled wall sections for assembly, wherein;
the falsework and the exterior wall sections are composed of a wooden material,
the exterior wall sections when fully assembled are configured to bear the entire load of the tower,
the falsework is configured to hold and bear the load of unconnected wall sections during assembly, and;
the vertically oriented members of the falsework are spaced from the external wall sections.

22. The tower as claimed in claim 21, characterized in that the falsework is composed of a plurality of sections, with one section, at its upper end, having a platform, to which the wall sections are connected, with the platform being a stiffening level of the falsework.

23. The tower as claimed in claim 21, characterized in that the falsework framework structure has at least four stands, which are connected by struts, bars, head blocks and sole blocks.

24. The tower as claimed in claim 21, characterized in that the wall sections are arranged offset with respect to one another, forming a helix, with the helix being a single helix or a multiple helix formed from a plurality of single helices.

25. The tower as claimed in claim 24, characterized in that the number of single helices which form the multiple helix corresponds to the number of wall sections on a horizontal level of the tower.

26. The tower as claimed in claim 21, characterized in that the upper abutment faces of the individual wall sections have a helix, a continuous line or a step.

27. The tower as claimed in claim 21, characterized in that the wooden material is cross-laminated timber or wooden composite material.

28. The tower as claimed in claim 21, characterized in that the tower can be assembled from the individual wall sections on site.

29. The tower as claimed in claim 21, characterized in that the surface of the outside of the tower is provided with a coating, with the coating absorbing at least some of the tensile load acting on the surface of the tower, and sealing the surface of the outside of the tower against the environmental influences, including moisture, acting on the surface from the outside.

30. The tower as claimed in claim 29, characterized in that the coating is applied at least in parts over the entire area to the surface of the outside of the tower, or in that the coating is a layer material, a film, a fabric, a panel or a textile.

* * * * *